United States Patent Office 3,074,929
Patented Jan. 22, 1963

3,074,929
GLYCOSIDES OF 6-MERCAPTOPURINE
George H. Hitchings, Yonkers, and Irving Goodman, White Plains, N.Y., assignors to Burroughs Wellcome & Co. (U.S.A.) Inc., Tuckahoe, N.Y., a corporation of New York
No Drawing. Filed Dec. 23, 1958, Ser. No. 782,410
Claims priority, application Great Britain Aug. 11, 1955
6 Claims. (Cl. 260—211.5)

The present invention relates to 9-glycosido-6-mercaptopurines and to a process for preparing the same.

The ability of 6-mercaptopurine to interfere with cell division has found a useful expression in the production of remissions of acute leukemia. The mechanism of action of 6-mercaptopurine is believed to be as an antagonist of the natural 6-substituted purines, which exist in cellular compositions combined through glycoside linkages.

The biological activity of 6-mercaptopurine is modified, and becomes more selective in the new compounds with the result that the range of usefulness of the growth inhibitor is extended.

The usual method of preparing purine glycosides is by the reaction of a heavy metal salt of the purine with a glycosyl halide. In the present instance this method is inoperable presumably because the metal salts are attached to the sulfur of the mercaptan group. However, it has been found that 6-benzylmercaptopurine will form a suitable silver salt, and that debenzylation of the eventual 9-glycosido-6-benzylmercaptopurines can be effected by treating with sodium in liquid ammonia.

The above method was disclosed in our co-pending application Serial No. 574,575, now abandoned, of which the present is a continuation-in-part. In that application, there was also described an alternative method wherein 6-chloropurine was converted through its chloromercuri derivative to its 9-triacetylriboside and that, in turn, by reaction with thiourea and subsequent deacetylation resulted in thioinosine.

This second route has now been enlarged by two variations. It has been found that the 6-chloropurines are converted to 6-mercaptopurines with especial convenience by reaction with thio-acetic acid. Presumably a 6-thioacetate is formed first and this undergoes spontaneous hydrolysis to the 6-thiol.

The synthesis from simple purine and sugar moieties of nucleosides is time consuming and the yields are inferior. Our second variation consists of starting with the naturally occurring and reasonably available nucleosides, inosine and guanosine. The first step is to protect the sugar hydroxyls by acetylation or benzoylation. At this point (II in the chart) a direct thiation is possible but results in excessive tar-formation. We have found that it is more satisfactory to treat the acylated nucleoside with phosphorus oxychloride in the presence of a weak base and so to obtain the 6-chloronucleoside (III) which can then be converted to the 6-mercaptonucleoside (V), by the methods previously discussed. Practical success of either route is in fact rather surprising since these nucleosides are very sensitive, especially to acids and alkalines. It is not apparent why phosphorus oxychloride should be less damaging than phosphorus pentasulfide, but this appears to be the case.

Not only the nucleosides of 6-mercaptopurine and thioguanine but also their acylated derivatives (IV) are of therapeutic interest. Esterification of the sugar hydroxyls modifies the solubility characteristics of the compounds. It is probable that the ester moieties are removed in the body but the absorption of the drug and also its rate of excretion being modified, the action may be favorably affected.

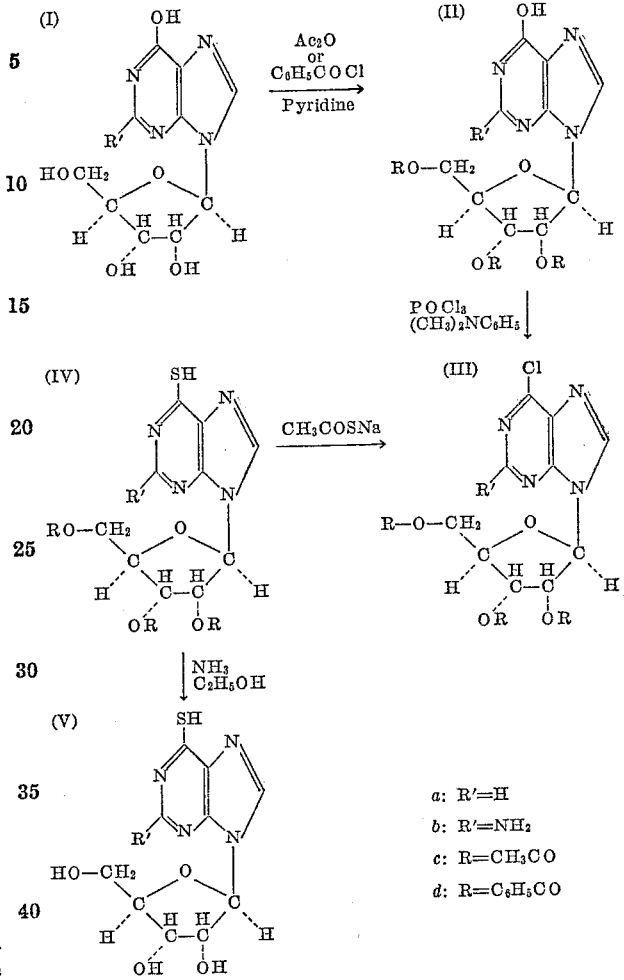

a: R'=H
b: R'=NH₂
c: R=CH₃CO
d: R=C₆H₅CO

EXAMPLE 1

6-Benzylmercaptopurine Silver 10 gm. of 6-benzylmercaptopurine is dissolved in 200 cc. concentrated NH₄OH. This process is endothermic and the mixture should be kept warm on the steam bath until the solid has dissolved. A solution of 7.2 gm. of silver nitrate is added to the ammoniacal solution of the purine with vigorous stirring. A heavy white gelatinous precipitate forms at once. The viscous solution is diluted with 300 cc. of water and left on the stirrer for one hour. The precipitate is then removed by filtration and washed repeatedly with water. Yield 13.2 gm. (92% of theory), M.P. 240–244° dec.

6-Benzylmercapto-9-β-d-Tetraacetylglucopyranosylpurine 5.07 gm. (0.0145 M) of the above compound was carefully dried and suspended in 100 cc. anhydrous xylene. To the suspension was added an equivalent (5.4 gm.) of tetraacetyl-α-d-glucopyranosyl chloride. The suspension was allowed to reflux for 17 hours with stirring. The gray precipitate was removed by filtration and washed with chloroform and the xylene filtrate was decolorized with charcoal and concentrated in vacuo on steam bath to remove all xylene. The amber viscous syrup was dissolved in methanol from which the acetylated nucleoside precipitates on standing in the cold. The precipitate was washed with anhydrous ether. It melts at 94–99° (hydrate?) and resolidifies, remelting at 145°.

EXAMPLE 2

6-Benzylmercapto-9-β-d-Glucopyranosylpurine 0.5 g. of the above compound was dissolved in 25 cc. of saturated ethanolic ammonia and allowed to stand at room temperature for 48 hours. The solution was concentrated to dryness, dissolved in 5 cc. of absolute ethanol and left to crystallize overnight in the cold. The product was filtered and washed with ether-ethanol 3:1. M.P. 110°.

9-β-d-Glucopyranosyl-6-Mercaptopurine 0.5 gm. of the above was dissolved in 100 cc. liquid $NH_3$. Bits of metallic sodium were added until the first permanent blue color. The color was then discharged by adding solid $NH_4Cl$.

The ammonia was allowed to evaporate. The last traces were removed by warming the reaction flask in vacuo. A solution of 10 cc. absolute alcohol containing 0.5 cc. glacial acetic acid was added to the residue. A crystalline product was obtained from the solution; M.P., 205°. λ max. pH 1, 223, 322 mμ; pH 11, 310.

EXAMPLE 3

6-Benzylmercapto-9-(β-d-2',5'-Diacetylglucofuranuronolactonyl)Purine 5.5 gm. (0.0157 M) of 6-benzylmercaptopurine silver and an equivalent (4.4 gm.) of 1-chloro-2,5-diacetylglucuronolactone were suspended in 150 cc. of anhydrous xylene. The mixture was refluxed for 17 hours with stirring, and was then filtered to remove the AgCl. The filtrate was decolorized with charcoal and concentrated to a syrup in vacuo. The syrup was dissolved in 10 cc. of absolute ethanol. On standing for 20 hours at 5°, a yellowish crystalline precipitate formed. Yield 1.3 gm. (17% of theory).

The ultraviolet absorption spectrum of this was almost identical with that of 9-ribofuranosyl-6-benzylmercaptopurine, thus confirming the ascribed structure. λ max. pH 1, 295 mμ; pH 11, 293 mμ. λ min pH 1, 253 mμ; pH 11, 253 mμ. ε mol pH 1, 16.3; pH 11, 16.6. This property is especially notable with 9-ribo-furanosyl-6-mercaptopurine, which most closely resembles the naturally occurring nucleosides.

EXAMPLE 4

The Synthesis of 9-Ribofuranosyl-6-Mercaptopurine 10 g. of 6-benzylmercaptopurine-silver was added to a solution of 6.5 g. of 1-chloro-2,3,5-triacetyl ribofuranose in 600 ml. anhydrous xylene. The mixture was refluxed with stirring for 48 hours. The residue of AgCl and unreacted silver salt was removed by filtration and the decolorized filtrate concentrated to a syrup in vacuo. The product 9-(2',3',5'-triacetylribofuranosyl)-6-benzylmercaptopurine did not crystallize, but showed the expected ultraviolet absorption spectrum with λ max. at 290 mμ, pH 1 to 11.

9-Ribofuranosyl-6-Benzylmercaptopurine

The benzylmercaptonucleoside was prepared from the acetylated derivative above by dissolving the latter in 50 ml. absolute ethanol saturated with $NH_3$. After standing overnight at room temperature, the solution was concentrated to a syrup in vacuo. No crystals were obtained, but the ultraviolet absorption spectrum was in agreement with that previously obtained for the corresponding 9-glucosyl derivative. λ max. 290 mμ, pH 1 to 11.

9-Ribofuranosyl-6-Mercaptopurine

This nucleoside of 6-mercaptopurine was obtained upon debenzylation of the syrup produced above. 2 g. of the benzylmercapto derivative was dissolved in 50 ml. liquid $NH_3$ to which was added 0.4 g. metallic Na. After evaporation of the $NH_3$ and dissolving the residue in 10 ml. 95% ethanol, 1 ml. acetic acid was added, and 0.1 g. of impure solid was obtained. This material showed ultraviolet absorption characteristic of the 9-glucosyl-6-mercaptopurine. λ max.=225, 321 at pH 1; 234, 311 mμ at pH 11. The product gives a positive Mohlisch test, and was shown by paper chromatography to be identical with the same product prepared from 6-chloropurine (V.L.). Rf=0.80 using a solvent system of $(NH_4)_2SO_4$:isopropanol:$H_2O$, 5:5:90.

This nucleoside was obtained by a second method, using chloromercuri-6-chloropurine derivative, as illustrated in the following reactions:

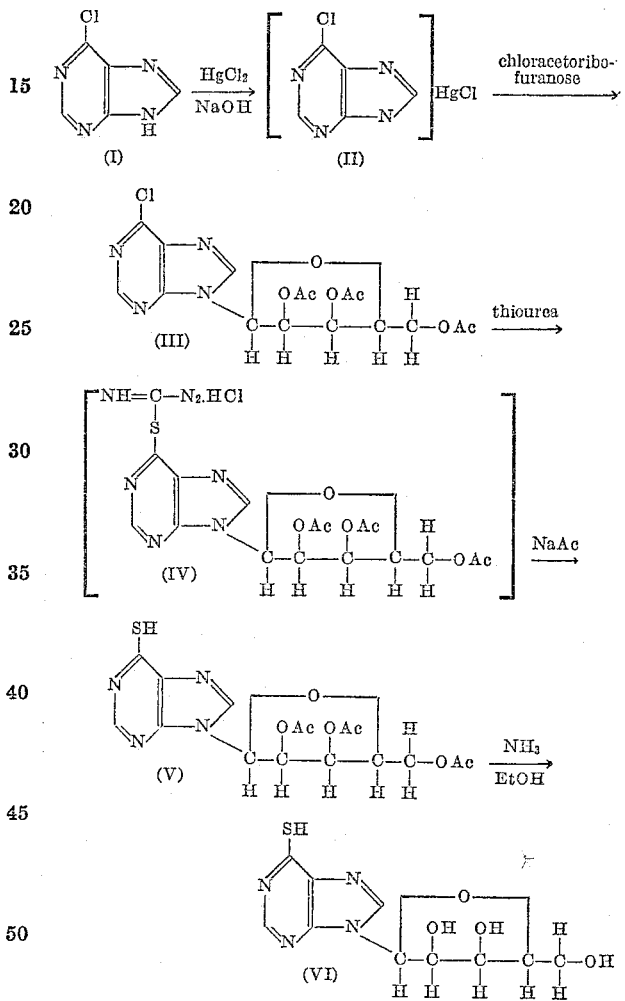

EXAMPLE 5

Chloromercuri-6-Chloropurine (II)

28.8 g. of 6-chloropurine was dissolved in 200 ml. of water containing 7.4 g. NaOH. A solution containing 50.5 g. $HgCl_2$ in 250 ml. 95% ethanol was added. 51 g. of (II) was obtained.

9-(2',3',5'-Triacetylribofuranosyl)-6-Chloropurine (III)

Eight g. of chloromercuri-6-chloropurine was added to a solution of 7 g. 1-chloro-2,3,5-triacetylribofuranose in 100 ml. anhydrous xylene. The solution was refluxed for 48 hours, filtered and the filtrate was concentrated to a syrup. The product was an impure oil.

9-Ribofuranosyl-6-Mercaptopurine

Two g. of the syrup (III) was refluxed with 0.2 g. thiourea and 0.2 g. sodium acetate in absolute ethanol for 18 hours. The resulting solution of the thiouronium salt (IV) was filtered, treated with $H_2S$ to remove any remaining Hg, decolorized with Darco, concentrated to a syrup and taken up in absolute ethanol. The ethanolic solution was saturated with $NH_3$ and left for 18 hours at room temperature. A very small amount (50 mg.) of product was obtained.

λ max.=225, 321 at pH 1; 234, 311 mµ at pH 11; the product gives a positive Mohlisch test and was shown by paper chromatography to have a mobility resembling that of the corresponding glucosyl derivative.

EXAMPLE 6

*6-Hydroxy-9-(2,3,5-Tri-O-Acetylribofuranosyl)-Purine (IIac)*

15 g. of inosine (I) is suspended in 200 ml. pyridine. To the suspension is added 100 ml. acetic anhydride. After stirring until homogeneous, the mixture is kept on the steam bath for 2 hours. The resulting clear amber-colored solution is concentrated to semi-solid state in vacuo. 250 ml. of ice water is added to the residue, whereupon the solid dissolves with the evolution of heat. Upon cooling for 5 minutes in an ice bath, the white crystalline product appears. After keeping at 4° C. for one hour, the crystals are collected by filtration and washed with ice water. Yield, 19.5 g. (89% of theory). M.P. 230°. λ max.=245mµ (in absolute EtOH).

EXAMPLE 7

*6-Chloro-9-(2,3,5-Tri-O-Acetylribofuranosyl)-Purine (IIIac)*

16.0 g. of triacetylinosine (II) is intimately mixed with 10 ml. of dimethylaniline. To the mixture is added 100 ml. of $POCl_3$. The suspension is heated on the steam bath for 4 hours (anhydrous conditions). The homogeneous dark brown solution is then concentrated in vacuo on the steam bath to remove the excess $POCl_3$. The remaining brown syrup is dissolved in 250 ml. $CHCl_3$. The $CHCl_3$ solution is washed 5 times with 75 ml. portions of $H_2O$ in a separatory funnel, after which the water washings are at pH 5 to 6. The $CHCl_3$ layer is dried over anhydrous $Na_2SO_4$ and is concentrated to a syrup. Final traces of solvent are removed under high vacuum. The yield of crude product isolated as a syrup is 14.8 g. (89% of theory. λ max.=265 mµ (in $H_2O$).

EXAMPLE 8

*6-Mercapto-9-(2,3,5-Tri-O-Acetylribofuranosyl)-Purine (IVac)*

1.3 g. of (III) was dissolved in 10 ml. of absolute ethanol. To this solution was added a solution containing 0.6 g. of sodium thioacetate in 10 ml. of absolute ethanol. The clear solution was refluxed on the steam bath for 1 hour. The warm solution was filtered, and, upon cooling, the product crystallized in the form of white plates. Yield, 800 mg. (62% of theory). λ max.=325 mµ in absolute ethanol.

EXAMPLE 9

*6-Mercapto-9-Ribofuranosylpurine (Va)*

95 mg. of (IV) was dissolved in 25 ml. of absolute ethanol saturated with $NH_3$. The solution was kept at room temperature for 18 hours after which it was concentrated in vacuo to about 5 ml. and cooled in an ice bath. 40 mg. of pure 6-MP riboside (Va) was isolated; (60% of theory). λ max.=225, 321 at pH 1; 234, 311 mµ at pH 11.

EXAMPLE 10

*6-Hydroxy-9-(2,3,5-Tri-O-Benzoylribofuranosyl)-Purine (IIad)*

Five g. of inosine was suspended in 10 ml. of pyridine. The mixture was cooled at 0° in an ice bath. To the cold suspension, 25 ml. of $CHCl_3$ followed by 10 g. of benzoyl chloride was added. The mixture was heated at 100° for 2 hours, allowing the $CHCl_3$ to distill off.

The resultant syrup was dissolved in 100 ml. of $CHCl_3$. The $CHCl_3$ solution was washed with saturated $NaHCO_3$ solution and then with saturated $NaHSO_4$ solution followed by water. After drying over $Na_2SO_4$ the $CHCl_3$ solution was concentrated in vacuo to a syrup which, on treatment with anhydrous ether, formed the solid benzoyl derivative. Yield, 10 g. (92% of theory) N=9.61%. Theory N=9.68%. λ max.=230 and 265 mµ in alcohol.

EXAMPLE 11

*6-Chloro-9-(2,3,5-Tri-O-Benzoylribofuranosyl)-Purine (IIIad)*

Five g. of tribenzoylinosine (Example 10) was suspended in 5 ml. of dimethylaniline. To this suspension was added 61 g. of $POCl_3$ whereupon the solid dissolved. The mixture was heated at 100° for 4 hours. The resulting light yellow solution was poured into 800 ml. of ice water-$CHCl_3$ (1:1 by volume). The water layer was extracted twice with $CHCl_3$. The $CHCl_3$ layer was washed twice with saturated $NaHCO_3$ solution and then with water. After drying over $Na_2SO_4$ the $CHCl_3$ layer was concentrated in vacuo to a syrup. The resulting syrup was dissolved in 100 ml. of absolute alcohol and poured into 600 ml. of water. Upon acidification to pH 2 with HCl, a precipitate was formed. Yield 6 g. of crude product. λ max.=230 and 260 mµ in alcohol. The 230 mµ peak is characteristic of the benzoyl derivatives while the 260 peak is similar to that of the parent purine, 6-chloropurine with a peak at 265 (aqueous solution, pH 1). The product contains Cl (organic) and gives a positive Mohlisch test.

EXAMPLE 12

*6-Mercapto-9-(2,3,5-Tri-O-Benzoylribofuranosyl)-Purine (IVad)*

One g. of the 6-chloronucleoside of Example 11 was dissolved in 25 ml. of absolute alcohol. To this was added a solution containing 0.4 g. of sodium thioacetate in 5 ml. of alcohol. The mixture was heated under reflux for one hour. On cooling for 18 hours at 4° C., a flocculant precipitate was formed. The solution was acidified with 0.1 N HCl and filtered. Yield, 400 mg. N=9.35%; theory, N=9.42%. λ max.=230, 265 and 322 mµ in abs. alcohol.

EXAMPLE 13

*2-Amino-6-Hydroxy-9-(2,3,5-Tri-O-Acetylribofuranosyl)-Purine (IIbc)*

Fifty g. of guanosine (commercial grade) was suspended in 500 ml. of pyridine. To this was added 250 ml. of acetic anhydride. The mixture was heated at 100° for 17 hours. The resulting solution was poured into 1600 ml. of water and extracted with $CHCl_3$ (3–200 ml. portions). The $CHCl_3$ solution was washed twice with saturated $NaHSO_4$ solution (2 x 200 ml.), twice with 200 ml. portions of $H_2O$, dried over $Na_2SO_4$, and concentrated to a syrup in vacuo. The syrup, on trituration with anhydrous ether formed a crude solid product (63 g.) λ max. = 258 mµ at pH 6; 265 mµ at pH 12. The product shows U.V. characteristics similar to guanosine as would be expected.

EXAMPLE 14

*2-Amino-6-Chloro-9-(2,3,5-Tri-O-Acetylribofuranosyl)-Purine (IIIbc)*

Twenty-five g. of the above ester was suspended in 35 ml. of dimethylaniline. To this was added 240 g. of $POCl_3$. The mixture was heated at 100° under reflux for 4 hours. The resulting solution was concentrated in vacuo on the steam bath to a syrup. The syrup was dissolved in 200 ml. of $CHCl_3$, which solution was extracted several times with 75 ml. portions of $H_2O$ until the pH of the washings was about 4. After drying over $Na_2SO_4$ the $CHCl_3$ layer was concentrated in vacuo to a syrup. To this was added anhydrous ether. The resulting hygroscopic solid was dried in vacuo. Yield 12 g. λ max. 252 and 285 mµ in alcohol. Contains chlorine (organic). Positive Mohlisch test.

EXAMPLE 15

*2-Amino-6-Mercapto-9-(2,3,5-Tri-O-Acetylribofuranosyl)-Purine (IVbc)*

One g. of the above chloro compound was dissolved in 25 ml. of absolute alcohol. To this was added a solution of 0.5 g. of sodium thioacetate in 5 ml. of absolute alcohol. The mixture was refluxed for 2 hours, filtered, and concentrated to dryness in vacuo. The solid residue was treated with 50 ml. of water. A precipitate formed with U.V. characteristics similar to the parent purine compound, thioguanine. U.V., λ max. at 250 and 340 mμ in absolute alcohol. The 340 peak is characteristic of the mercapto group of thioguanine. A positive Mohlisch test indicates the presence intact of the ribosyl group.

EXAMPLE 16

*Tribenzoyl Guanosine (IIbd)*

Benzoylation was accomplished by the method described for the benzoylation of inosine (Example 10). The product was isolated as a crystalline solid, M.P. 205–8°. N=11.36%. Calculated N=11.75%. λ max.= 230, 270 in alcohol.

EXAMPLE 17

*2-Amino-6-Chloro-9-(2,3,5-Tri-O-Benzoylribofuranosyl)-Purine (IIIbd)*

Five g. of tribenzoylinosine (Example 16) was chlorinated with POCl$_3$ as described in Examples 11 and 14. The product was isolated as an amorphous powder, probably a salt of H$_3$PO$_4$. It contains chlorine (organic), N, and P. Analysis for N: Found, N=9.57%; calculated for 1 mole H$_3$PO$_4$, N=9.85%. λ max.=230, 280 mμ in alcohol.

EXAMPLE 18

*2-Amino-6-Mercapto-9-β-D-Ribofuranosylpurine (IVb)*

One-tenth g. of 2-amino-6-mercapto-9-triacetylribofuranosylpurine (Example 15) was dissolved in 2.5 cc. of alcohol saturated with ammonia. The solution was allowed to stand over-night at room temperature and was then evaporated in vacuo. The residue, after washing with absolute ethanol was a brown amorphous powder. It gave a positive Mohlisch test and had the ultra-violet absorption of a thioguanine derivative. (λ max. (H$_2$O) 260 and 340 mμ. At pH 11, λ max. 250 and 320 mμ. The peaks at 340 and 320 mμ are very distinct and characteristic.)

What we claim is:
1. A compound represented by the formula

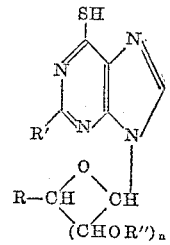

wherein R' is selected from the class consisting of NH$_2$ and hydrogen, R is selected from the class consisting of CH$_2$OH, CH$_2$OCOCH$_3$, CH$_2$OCOC$_6$H$_5$ and hydrogen, R" is selected from the class consisting of COCH$_3$, COC$_6$H$_5$ and hydrogen and *n* is an integer having the values 2 and 3.

2. A 9-d-glucoside of 6-mercaptopurine.
3. A 9-d-riboside of 6-mercaptopurine.
4. A 9-d-riboside of 2-amino-6-mercaptopurine.
5. A 9-acetylated glucuronide of 6-mercaptopurine.
6. A 9-glycosido-6-mercaptopurine.

References Cited in the file of this patent

UNITED STATES PATENTS

| | | |
|---|---|---|
| 2,852,505 | Baker | Sept. 16, 1958 |
| 2,852,506 | Goldman et al. | Sept. 16, 1958 |

OTHER REFERENCES

Friedkin, Biochim et Biophys Acta. 18, 447–448 (November 1955), cited in Chemical Abstracts. 50, 3516[1] (1956). (Chemical Abstract available in P.O. Sci. Lib.)

Johnson, Jr., et al., J. Am. Chem. Soc. 78, 3863 (1956). (Copy in P.O. Sci. Lib.)